United States Patent
Faulkner et al.

(10) Patent No.: US 11,747,788 B1
(45) Date of Patent: Sep. 5, 2023

(54) RACK-MOUNT COMPUTING EQUIPMENT WITH PRESENCE SENSOR

(71) Applicant: Enconnex LLC, Reno, NV (US)

(72) Inventors: Robert Faulkner, Reno, NV (US); John Kirkpatrick, Reno, NV (US); Anthony Dela Cruz, Reno, NV (US); Benjamin Luke, Sparks, NV (US)

(73) Assignee: Enconnex LLC, Reno, NV (US)

( * ) Notice: Subject to any disclaimer, the term of this patent is extended or adjusted under 35 U.S.C. 154(b) by 0 days.

(21) Appl. No.: 17/823,947

(22) Filed: Aug. 31, 2022

(51) Int. Cl.
| | |
|---|---|
| *G06F 3/14* | (2006.01) |
| *G05B 19/4155* | (2006.01) |
| *G06F 1/18* | (2006.01) |
| *G06F 1/26* | (2006.01) |
| *G08B 17/00* | (2006.01) |

(52) U.S. Cl.
CPC ......... *G05B 19/4155* (2013.01); *G06F 1/181* (2013.01); *G06F 1/26* (2013.01); *G06F 3/14* (2013.01); *G05B 2219/49216* (2013.01); *G08B 17/00* (2013.01)

(58) Field of Classification Search
CPC ...... G05B 19/4155; G05B 2219/49216; G06F 1/181; G06F 1/26; G06F 3/14; G08B 17/00
USPC .................. 700/300; 713/300, 320, 330, 340
See application file for complete search history.

(56) References Cited

U.S. PATENT DOCUMENTS

| | | | |
|---|---|---|---|
| 7,983,770 B2 * | 7/2011 | Langgood | H05K 7/20209 702/191 |
| 10,120,743 B2 | 11/2018 | Joshi et al. | |
| 10,440,545 B2 | 10/2019 | Horton et al. | |
| 11,087,278 B1 | 8/2021 | Cho et al. | |
| 11,126,579 B2 | 9/2021 | Lefebvre et al. | |

(Continued)

FOREIGN PATENT DOCUMENTS

| | | |
|---|---|---|
| IN | 20211005580 | 2/2021 |
| KR | 102315592 B1 | 10/2021 |

(Continued)

OTHER PUBLICATIONS

Githinji, M. M., "Remote telecommunications sites overlay monitoring system." Dissertation. KCA University. Sep. 2016.

(Continued)

*Primary Examiner* — Michael J Brown
(74) *Attorney, Agent, or Firm* — United IP Counselors, LLC (57) ABSTRACT

A piece of electronic equipment, such as an uninterruptible power supply (UPS) or server, has a case adapted for mounting in a rack or cabinet. The equipment includes a presence sensor installed within the case such that it has an external field of view. A controller connected to the presence sensor. In response to a presence detection by the presence sensor, the piece of electronic equipment may take any of a number of different actions, at least some of which are geared toward making the area around the equipment more comfortable for workers and providing workers with helpful information. These actions may include, but are not limited to, changing the speeds of internal fans, powering up a display to provide status and maintenance information, and other such actions. The presence sensor may also be used to detect emergency conditions, such as fire.

16 Claims, 6 Drawing Sheets

(56) References Cited

U.S. PATENT DOCUMENTS

| | | | |
|---|---|---|---|
| 11,184,851 B2 | 11/2021 | Emmanuel et al. | |
| 2002/0080852 A1* | 6/2002 | Mirov | G01K 1/20 |
| | | | 374/208 |
| 2008/0111060 A1* | 5/2008 | Tourdot | A47B 53/02 |
| | | | 250/221 |
| 2010/0030395 A1* | 2/2010 | Shimotono | G06F 1/206 |
| | | | 715/764 |
| 2013/0078901 A1* | 3/2013 | Curtin | H05K 7/20745 |
| | | | 454/184 |
| 2019/0166723 A1* | 5/2019 | Long | H05K 7/20745 |
| 2021/0144344 A1 | 5/2021 | Ryan et al. | |
| 2021/0248658 A1 | 8/2021 | Kaliamurthy et al. | |
| 2021/0350923 A1 | 11/2021 | McKirdy | |
| 2022/0031105 A1 | 2/2022 | Newcomb | |

FOREIGN PATENT DOCUMENTS

| | | |
|---|---|---|
| KR | 102330043 B1 | 11/2021 |
| WO | 2016007192 A1 | 1/2016 |
| WO | 2021180846 A1 | 9/2021 |
| WO | 2022040191 A1 | 2/2022 |
| WO | 2022040366 A1 | 2/2022 |

OTHER PUBLICATIONS

Mayton, B., et al., "TRUSS: Tracking Risk with Ubiquitous Smart Sensing." Sensors, IEEE, Aug. 2012.

* cited by examiner

RACK-MOUNT COMPUTING EQUIPMENT WITH PRESENCE SENSOR

TECHNICAL FIELD

Embodiments of the invention relate to rack-mount computing equipment, such as servers, routers, switches, and uninterruptible power supplies (UPSes) with presence sensors.

BACKGROUND

Enterprise-scale commercial computing equipment is usually made to standard dimensions for mounting in a rack or cabinet. A small- or medium-sized company might have one or two racks or cabinets, each one containing equipment like servers, switches, routers, and uninterruptible power supplies (UPSes) that allow the company's computing systems to communicate via a network, to share files and, with respect to UPSes, to continue to operate if there is a temporary loss of power. U.S. Patent Application Publication No. 2022/0087047 discloses examples of racks and cabinets that may be used to house computing equipment.

At larger scale, such computing equipment is found in data centers, which often include row upon row of racks or cabinets, each rack or cabinet containing computing equipment. Data centers form the physical backbone of the Internet and of cloud computing, their servers holding the Internet's data, and their network connections allowing those servers to communicate worldwide. In general, they are designed with the expectation that the computing equipment should always be operating. For example, should the power fail, a UPS in each rack or cabinet will usually provide immediate power for the computing equipment while large electrical generators are started to continue providing power until power from the local power grid is again available.

Data centers are peculiar environments, designed more for computing equipment than for humans and intended to run in automated fashion as much as possible. Every minute, thousands of people may interact with a server virtually via networked connections, but the physical server computer may lie largely untended in a rack or cabinet. Meanwhile, most supporting equipment, like routers, switches, and UPSes, lies behind a firewall, connected only to an internal network within the data center, and not to any outside networks. This is because exposure of this kind of critical infrastructure to outside networks like the Internet could invite mayhem.

When a human does need to venture among the cabinets or racks, e.g., to repair or replace a piece of equipment, he or she might find the experience to be hot, loud, and uninviting. Computing equipment generates a lot of heat, and internal cooling fans within the equipment can generate a lot of noise. Air flow around the equipment can be substantial—air conditioning systems create pressurized airflows to maintain optimal temperature for the computing equipment. To maximize the lifetime of the computing equipment, the data center environment is sometimes uncomfortable for the engineers and technicians who maintain the equipment.

BRIEF SUMMARY

One aspect of the invention relates to a piece of electronic equipment, such as an uninterruptible power supply (UPS) or server, with a case adapted for mounting in a rack or cabinet. The equipment includes a presence sensor installed within the case such that it has an external field of view, and a controller connected to the presence sensor. In response to a presence detection by the presence sensor, the piece of electronic equipment may take any of a number of different actions, at least some of which are geared toward making the area around the equipment more comfortable for workers and providing workers with helpful information. These actions may include, but are not limited to, changing the speeds of internal fans, powering up a display to provide status and maintenance information, sending notifications of the presence, and other such actions.

Because changing the speeds of internal fans and other such alterations to the hardware state of the equipment may have the effect of sacrificing some of the lifetime of the equipment, changes may be made in accordance with measured internal temperatures and other measured parameters, such that the changes made in response to a presence detection depend on the measured internal temperatures or other parameters. State changes may also be subject to a timeout or other type of maximum time limit, after which the prior state is restored.

Another aspect of the invention relates to a method. The method comprises detecting a presence around a piece of rack-mount equipment using a presence sensor installed within or in communication with the piece of rack-mount equipment. In response to such a detection, the state of the piece of equipment is temporarily changed.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
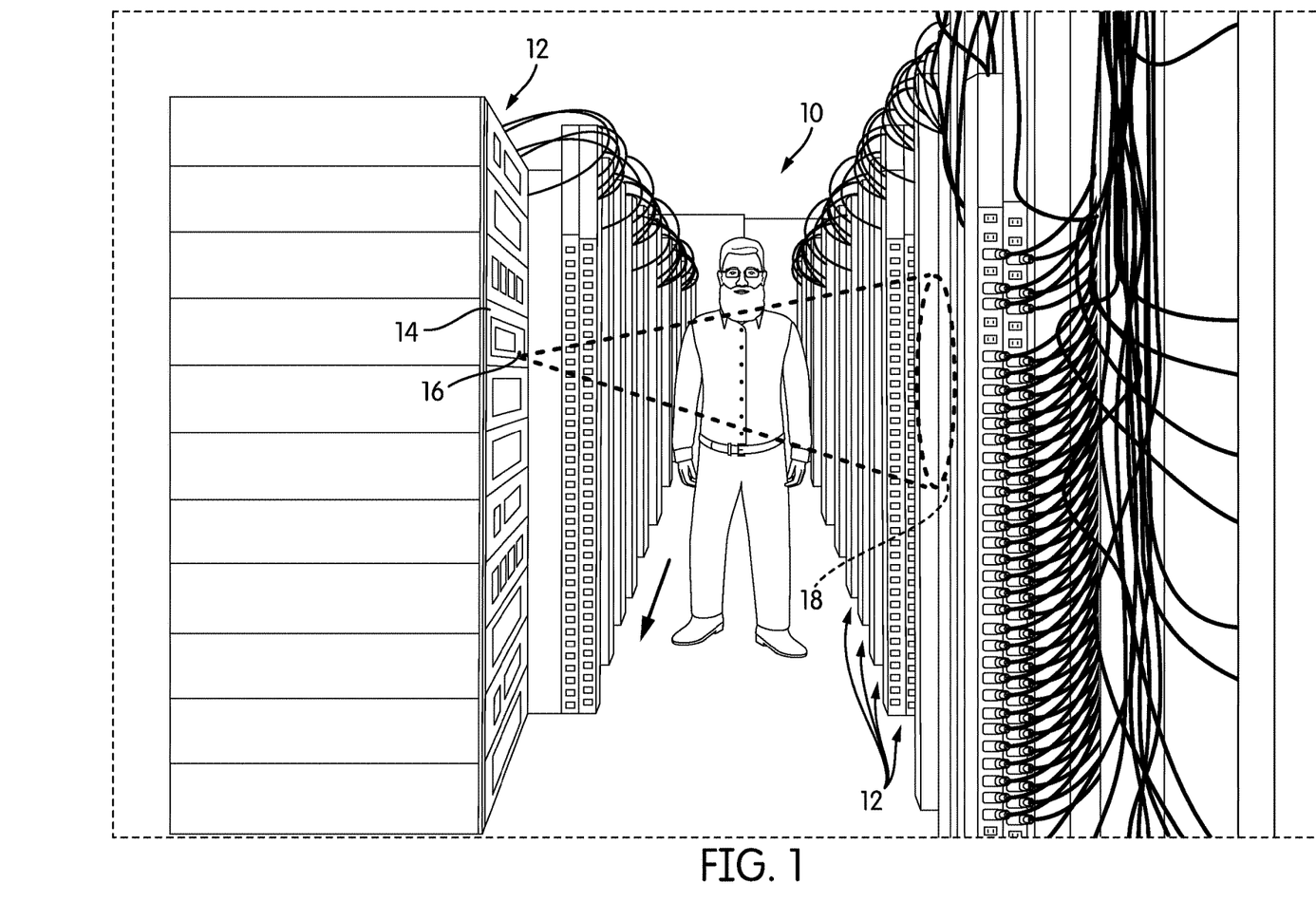
FIG. 1 is a partially cut-away perspective view of one row of a data center according to one embodiment of the invention, illustrating a piece of equipment with a presence sensor that has a field of view to detect the presence of a person nearby.

FIG. 1 is a perspective view of one aisle of a data center, generally indicated at 10. The aisle 10 includes a number of cabinets or racks 12 placed adjacent to one another. Each cabinet or rack 12 is designed to hold a number of pieces of computing equipment, each piece made to standard dimensions for mounting in such a cabinet or rack 12. The number of pieces of equipment in any one cabinet or rack 12 will depend on the dimensions of each piece of equipment, e.g., whether the pieces of equipment have standard heights of 1 U, 2 U, etc. The equipment itself may be referred to generally as "rack-mount" equipment.

At least to the extent that it is relevant here, cabinets and racks 12 have basically the same structure for mounting equipment, typically including structural upright members with vertical columns of mounting openings spaced at a specified pitch. The mounting openings are often universal, and their spacings and other characteristics are usually defined by national and international standards. The difference between a rack and a cabinet lies mainly in the fact that a cabinet is a closeable enclosure, usually including front or front and rear doors. The doors may have a transparent or translucent window or windows. The presence of the doors may allow a cabinet to better protect its contents against dust and other environmental contaminants, as well as allowing for dedicated cooling airflows in some cases. However, because cabinets and racks use the same basic structures to perform the same functions in basically the same way, the remainder of this description will use the terms "cabinet" and "rack" interchangeably, unless the differences between the two are relevant to the thing being described.

In FIG. 1, one piece of equipment 14 midway down the aisle 10 has a presence sensor 16 with a field of view 18 shown in broken lines in the figure. When a person enters the field of view 18 of the sensor 16, the piece of equipment 14 may be programmed to take certain actions. Those actions may involve sending notifications of the presence and making it easier for the person to work in the aisle 10 and to service the piece of equipment 14.

The presence sensor 16 may be any kind of sensor that allows the piece of equipment 14 to detect a disturbance in the ambient conditions characteristic of the entry of a person into its field of view 18. This includes infrared (IR) sensors, microphones, ultrasound-based sensors, time-of-flight sensors, Lidar sensors, and Radar sensors. Depending on the type of sensor, it may work passively by detecting an attribute of a person P entering its field of view, like increased infrared energy or characteristic sound, or it may work actively by detecting a change in, or an interruption of, energy that it emits and receives back. As may be apparent from this description, the nature of the presence sensor 16 may vary widely from embodiment to embodiment. For ease of description, the term "field of view" is used to describe the area, volume, plane, or zone in which the presence sensor 16 can detect a presence; the "field of view" need not be a literal, visual field of view.

Much of this description may assume, for example, that the presence sensor 16 is a passive IR (PIR) sensor with a field of view 18 that is a 90° cone with a range of about 2.4 meters (7.9 feet). Although the presence of a person is perhaps the most common type of detection, certain types of presence sensor 16 may detect certain other changes in ambient conditions, like smoke or fires, as well.

As shown in FIG. 1, the field of view 18 in the illustrated embodiment extends from the piece of equipment 14 straight out across the aisle. Given the position of the equipment 14 on the rack 12, this is sufficient to detect most people, because most people will enter the field of view 18 as they traverse through the aisle. However, in other embodiments, the field of view 18 could be broadened or aimed. It may be useful to broaden the field of view 18, narrow the field of view 18, or aim it if, for example, the piece of equipment 14 is installed in a particularly high or a particularly low position on the rack 12, or if the ordinary extent or location of the field of view 18 is likely to create false presence detections.

The particular types of events detected by the presence sensor, and the actions taken in response to a detection, will vary with the type of equipment 14, the type of detection, the preferences of the owner or operator of the equipment 14, the nature of any other equipment to which the equipment 14 is connected or with which it communicates, and the preferences of the data center operator or the operator of the facility that houses the equipment 14.

The equipment 14 may be a server, a router, a switch, a UPS, or any other kind of rack-mount equipment commonly installed in a rack 12. However, the remainder of this description will assume that the equipment 14 is a UPS. Because UPSes include large numbers of chemical battery cells, actively charge and discharge those cells, and convert large amounts of power between AC and DC, they may be particularly hot, include large numbers of fans, and generate more noise than some other components. For that reason, their reaction when a presence is detected may particularly influence the overall environment in and around a rack 12.

In FIG. 1, the equipment 14 is depicted as being mounted in the upper third of the rack 12. The position of the UPS 14 within the rack 12 may vary from embodiment to embodiment, although certain positions may require the presence sensor 16 to be calibrated or recalibrated. For example, because of size, weight, or other factors, certain UPS 14 units may need to be mounted low on the rack 12.

Figure 2:
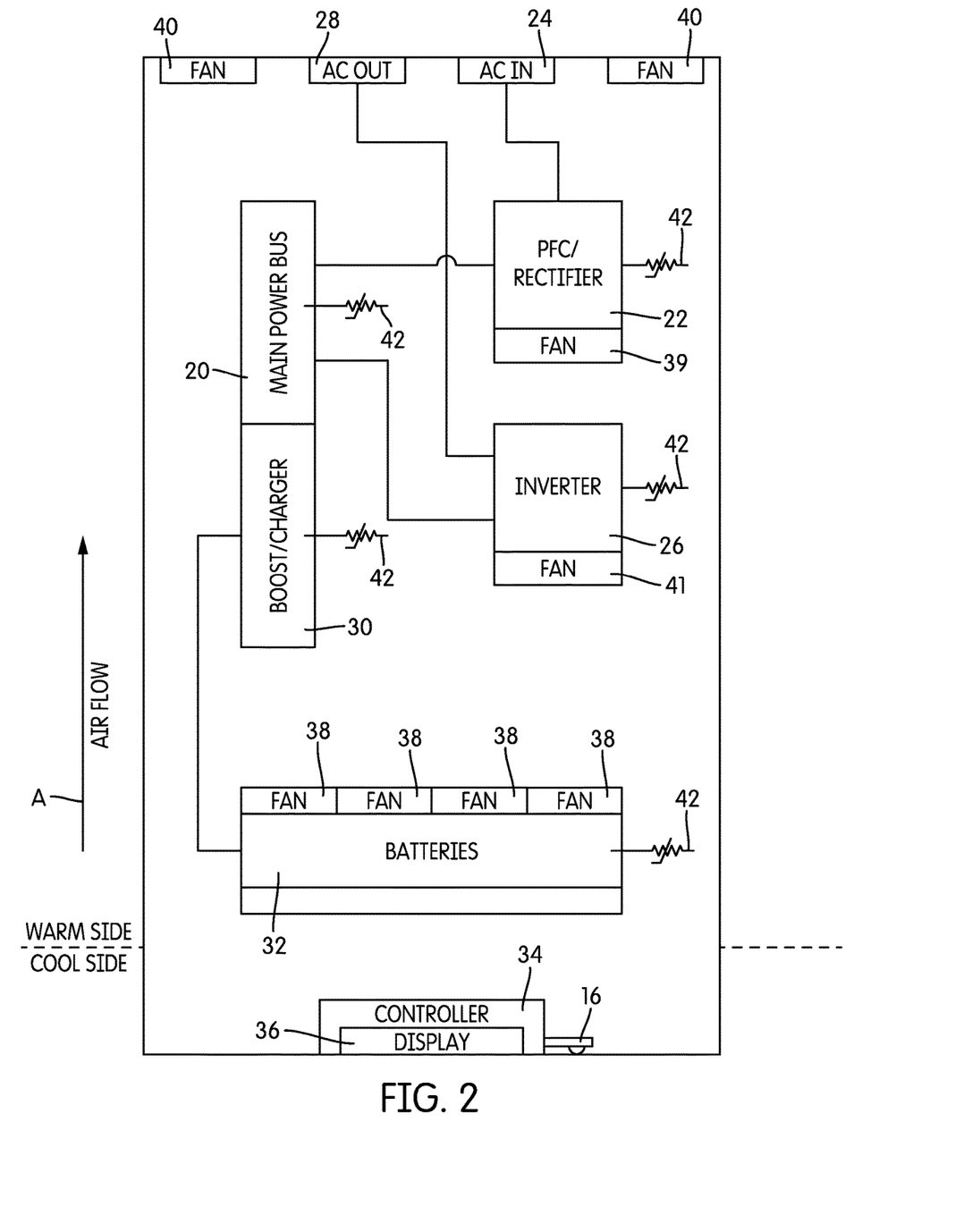
FIG. 2 is a schematic illustration of the interior layout of an uninterruptible power supply (UPS), illustrating in particular the locations of fans.

Because the response to a presence detection will vary depending on the type of UPS 14, it is helpful to consider an exemplary UPS 14, the components and layout of which are shown schematically in FIG. 2. The UPS 14 of the illustrated embodiment does not merely switch between an AC power source and batteries when necessary. Rather, the UPS 14 is of the type that includes an internal power bus operating at a defined voltage, e.g. 400 VDC. All power, including power from the batteries, is converted to direct current at the bus voltage. The power factor of incoming power is also corrected. Outgoing power is routed through an inverter to the load. This has the effect of providing a "clean" AC signal at a predefined frequency, usually 60 Hz in the United States.

As can be seen in FIG. 2, the UPS 14 includes a main power bus 20. Power factor correction and rectification circuitry 22 takes power from an AC input 24 and outputs bus-voltage direct current power to the main power bus 20. An inverter 26 takes power from the main power bus 20, generates an appropriate AC voltage, and outputs it to an AC output 28. DC boost and charging circuitry 30 controls the charging of the battery pack 32 and performs DC-DC conversion from the operating voltage of the battery pack 32 to the bus voltage. A controller 34 is responsible for the overall operation of the UPS 14, and is mounted at the front of the UPS 14. The controller 34 may be integrated with a display 36, and the display 36 may be touch-sensitive, such that it takes input and provides output. The presence sensor 16 may be mounted on the same printed circuit board (PCB) as the controller 34, or it may be separate. In many cases, a presence sensor 16 such as a PIR sensor would generate an analog output signal, which would be processed by an onboard analog-to-digital (AID) converter before being sent to the controller 34.

The battery pack 32 would typically comprise a number of individual battery cells, often with their contacts welded or otherwise permanently connected as needed. In this embodiment, the battery pack 32 is a self-contained unit with its own set of four cooling fans 38. There are also two draw fans 40 at the rear of the UPS 14, which would typically abut louvered openings in the case of the UPS 14. In addition, individual components that generate heat may include their own fans. As examples, in this embodiment, the PFC/rectifier 22 and the inverter 26 each have a dedicated fan 39, 41. More or fewer fans in different positions may be present.

For purposes of this description, it will be assumed that the battery pack 32 is comprised on lithium-ion battery cells. Such cells are often physically lighter than, e.g., lead-acid battery cells, potentially offering more mounting options for the UPS 14. However, the battery pack 32 may be comprised of lead-acid battery cells, or of any other type of cells.

Overall, the major circuitry components 20, 22, 26, 30 in the illustrated embodiment of the UPS 14 are arranged to the left and right sides of the UPS 14, leaving much of the central space of the UPS 14 open for airflow. The fans 38, 39, 40, 41 push and draw air in the same direction, creating an airflow from the front of the UPS 14 toward the back of the UPS 14, as indicated by arrow A in FIG. 2. (The air typically enters through perforations or louvered openings in the front and exits through perforations or louvered openings in the rear.) With this arrangement, the front of the UPS 14 can be considered the "cool" side, while the back of the UPS 14 unit, where hot air exits, can be considered to be the "warm" side.

In general, the cooler the UPS 14 is, the longer it will last. Thus, the controller 34 monitors the temperature of each of the major components 20, 22, 26, 30, 32. In order to monitor temperature, each major component 20, 22, 26, 30, 32 may be instrumented with a thermistor, thermocouple, or other such temperature-measuring component 42, which will be assumed to be a thermistor in the remainder of this description. The thermistors 42 would usually be placed at the hottest anticipated point of each component 20, 22, 26, 30, 32, although if there are multiple hot spots, multiple thermistors 42 may be used to measure each one. The controller 34 would typically have the capability to control which fans 38, 39, 40, 41 are on and which are off, as well as the speeds of the fans, depending on the temperature of the component or components in question. However, some fans 38, 39, 40, 41 may be controlled independently of the controller 34. For example, the fans 38 in the battery pack 32 may be controlled by a separate battery controller (not shown in FIG. 2) that is, at least on a high level, under the control of the controller 34. The UPS 14 may have additional fans or sub-controllers that are not illustrated in FIG. 2.

When a presence is detected, the response of a UPS 14 like the one illustrated in FIG. 2 may be to slow or stop certain fans, or to slow or stop all fans, potentially sacrificing some of the device's lifetime in order to quiet the UPS 14 for human presence and interaction. This would typically be done while monitoring the internal temperatures using the thermistors 42. The presence-specific behaviors would continue until a presence was no longer detected, until a predefined period of time had elapsed, or until the measured internal temperatures reach defined thresholds requiring the reactivation or speed-increase of fans 38, 39, 40, 41.

Figure 3:
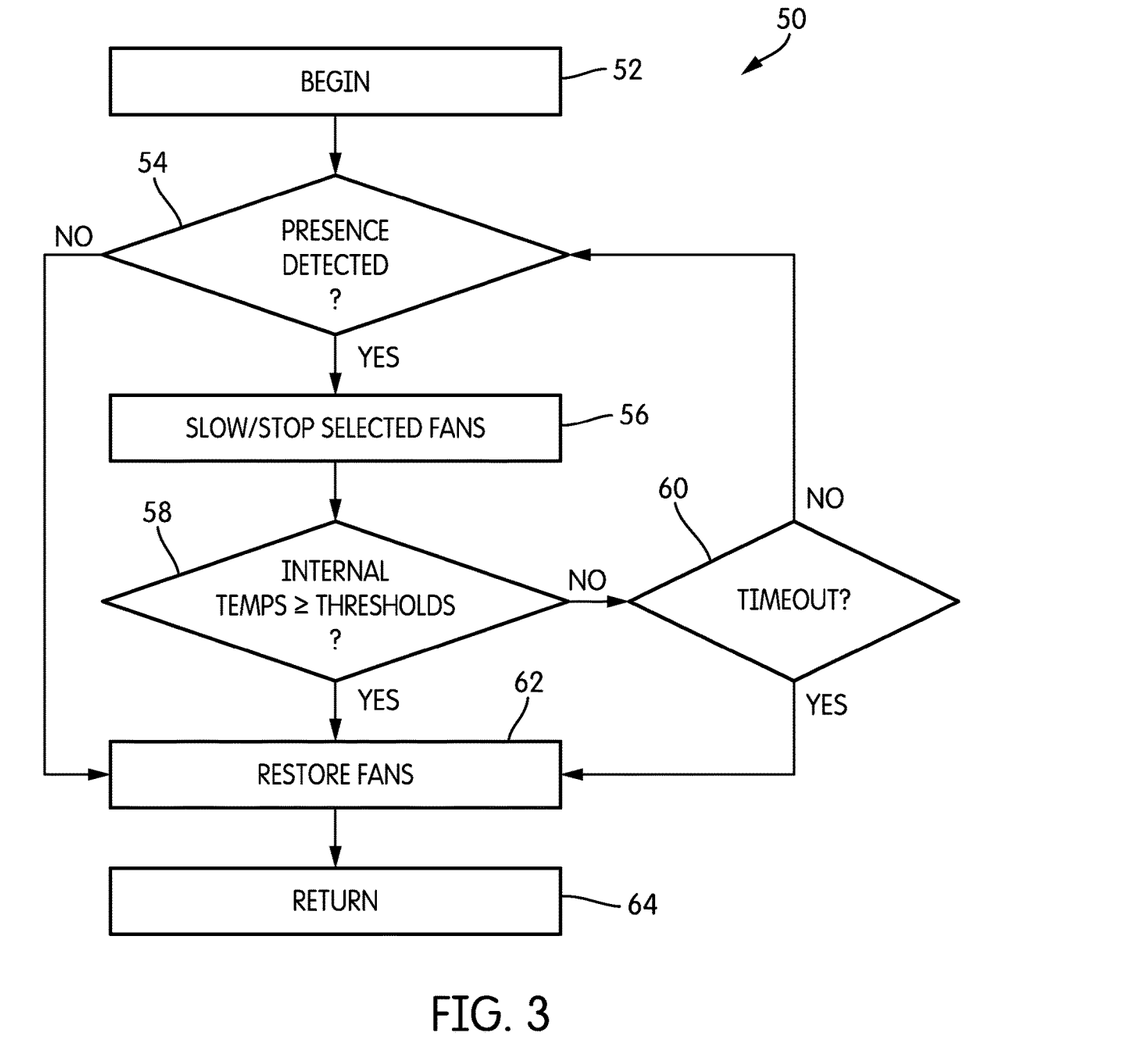
FIG. 3 is a flow diagram illustrating the tasks of a method for controlling internal fans to reduce noise when a presence is detected near the UPS of FIG. 2.

FIG. 3 is a schematic flow diagram of a method, generally indicated at 50, for controlling the fans 38, 40 of a UPS 14 in accordance with a presence detection by a presence sensor 16. Method 50 begins at task 52 and continues with task 54, a decision task in which it is determined whether or not a presence has been detected. If a presence has been detected by the sensor 16 (task 54:YES), method 50 continues with task 56; if no presence has been detected (task 54:NO), method 50 continues with task 62 and ensures that fans 38, 39, 40, 41 are running at normal operating speeds before returning at task 64.

In task 56, selected fans are slowed or stopped in order to reduce noise. This may be done with consideration of the noise and temperature characteristics of the UPS 14, keeping in mind the need to maintain some semblance of thermal control. For example, in some embodiments of method 50, the four fans 38 encapsulated within the battery pack 32 may be slowed or stopped, as these fans 38 are closest to the front end of the UPS 14 where the person P is near and, because they are typically smaller, often operate at higher, noisier speeds. In those embodiments, the draw fans 40 at the rear of the UPS 14 may be left on at their normal speed, may be slowed, or may be shut down entirely. The fans 39, 41 dedicated to high-heat components 22, 26 may be slowed or shut down depending on the measured temperatures of those components and, in most cases, predefined maximum temperature thresholds for the components 22, 26. The behavior executed in task 56 may be preprogrammed based on typical operating characteristics of the UPS 14 or similar units, or it may be determined at the time method 50 is executed, based on individual or average measured temperatures.

Once the fans 38, 39, 40, 41 have been slowed or stopped, the controller 34 begins (or continues) to read the internal temperatures reported by the various thermistors 42 and comparing those temperatures with a threshold or thresholds. The controller 34 may be preprogrammed with an overall threshold (e.g., no component may reach 50° C. (122° F.)), a threshold for each individual component (e.g., the inverter 26 may not be hotter than 50° C. and the battery pack 32 may not be hotter than 40° C. (104° F.)), or some combination of both. If any of the measured internal temperatures is equal to or greater than one or more of the defined thresholds (task 58:YES), then control of method 50 passes to task 62; if not (task 58:NO). In task 62, the fans 38, 40 that were slowed are returned to their previous speed or increased beyond that speed to bring internal temperatures below the thresholds before method 50 returns at task 64. As was described briefly above, task 62 serves as a general "reset" for method 50, and may be executed at other points as well.

In task 60, at least selected fans 38, 39, 40, 41 have been slowed or stopped, but internal temperatures within the UPS 14 are acceptably within tolerances. Thus, the UPS 14 can continue to operate in this state for some period of time. However, method 50 assumes that the UPS 14 cannot continue indefinitely with its fans 38, 39, 40, 41 turned off or throttled down. Thus, in task 60, the controller 34 is programmed to wait for some predetermined period of time (e.g., 3 seconds, 5, seconds, 10, seconds, 30 seconds, one minute, five minutes, ten minutes, twenty minutes, etc.) before timing out. If that timeout period has not expired (task 60:NO), control of method 50 returns to task 54 and the controller 34 checks if a presence is still detected. If, on the other hand, the timeout period has expired (task 60:YES), control passes to task 62 and the fans 38, 40 are restored at least to their prior states before method 50 returns at task 64. The timeout check of task 60 thus prevents the UPS 14 from operating indefinitely in the fan-slowed or fan-stopped altered state. The timeout counter may be stored and recalled between iterations of method 50, so that the controller 34 is able to consider the total time that the UPS 14 has been running with fans slowed or stopped. While not all embodiments need include a timeout counter, the timeout counter may be useful as a failsafe, e.g., in case of a prolonged presence, a malfunctioning presence sensor 16, or one or more malfunctioning thermistors 42.

In the UPS 14 and in method 50, temperature is measured directly. As those of skill in the art will realize, other measurements may be used to drive method 50. For example, the UPS 14 could be equipped with an anemometer and airflow could be measured. Alternatively, a thermistor 42 or other temperature sensor could be positioned to measure the temperature of the incoming ventilation air. The actions taken to control the fans 38, 40 in method 50 could then be made to depend, e.g., on a comparison of the temperature of the incoming air with the load on the UPS 14.

In some cases, a UPS 14 or another piece of equipment may not be equipped with internal temperature sensors. In that case, method 50 may be driven entirely by indirect measurements that tend to be indicative of internal temperature. For example, in a UPS, the electrical load on the UPS relative to its capacity may be measured. If the load is at 50% of capacity, the actions taken in method 50 may differ from those that would be taken if the load is at 80% of capacity. For servers and other such pieces of equipment in which electrical load is not the primary driver of increased internal temperatures, computational load, hard drive load or bandwidth, communication bandwidth or data rate, and other such metrics may be used as proxies for the internal temperature of components.

Proxies for internal temperature, rather than measured internal temperatures, may also be used in some other circumstances. For example, the measured internal temperatures may be compared with one or more proxies for internal temperature. If the controller 34 detects a gross mismatch in what the measured internal temperatures are and what they should be given current load or other metrics, the controller 34 may discount the reading of the temperature sensor(s) 42 and control the fans 38, 40 based on the load data.

Method 50 would typically be programmed into a non-transitory, machine-readable medium for execution on a machine like the controller 34. The non-transitory medium might include, e.g., the firmware or flash memory of the controller 34, or a hard drive or removable drive connected to the controller 34.

In the flow diagram of FIG. 3, method 50 is executed whenever a presence is detected by the presence sensor 16. However, in many implementations, method 50 will be executed only if the UPS 14 is in a particular state or states. For example, in some cases, method 50 may be executed only if the UPS 14 is supplying power from an AC power source; if the UPS 14 is supplying power entirely from the battery pack 32, method 50 may not be executed. Additionally, if the controller 34 senses any kind of error condition, method 50 may not be executed. In non-UPS equipment 14, the execution of methods like method 50 may also be state-dependent.

Fan control and noise reduction are not the only behaviors that may be triggered by a presence detection. Other behaviors that may be triggered by such a detection include, e.g., powering on the display 36 to display any error or status messages, communicating the presence to other computing equipment that is in the vicinity and, if needed, turning off or throttling down the fans 38, 40. The particular combination of behaviors that may be triggered in response to a presence detection will depend on the nature of the equipment 14, the environment of the data center, and other factors.

Figure 4:
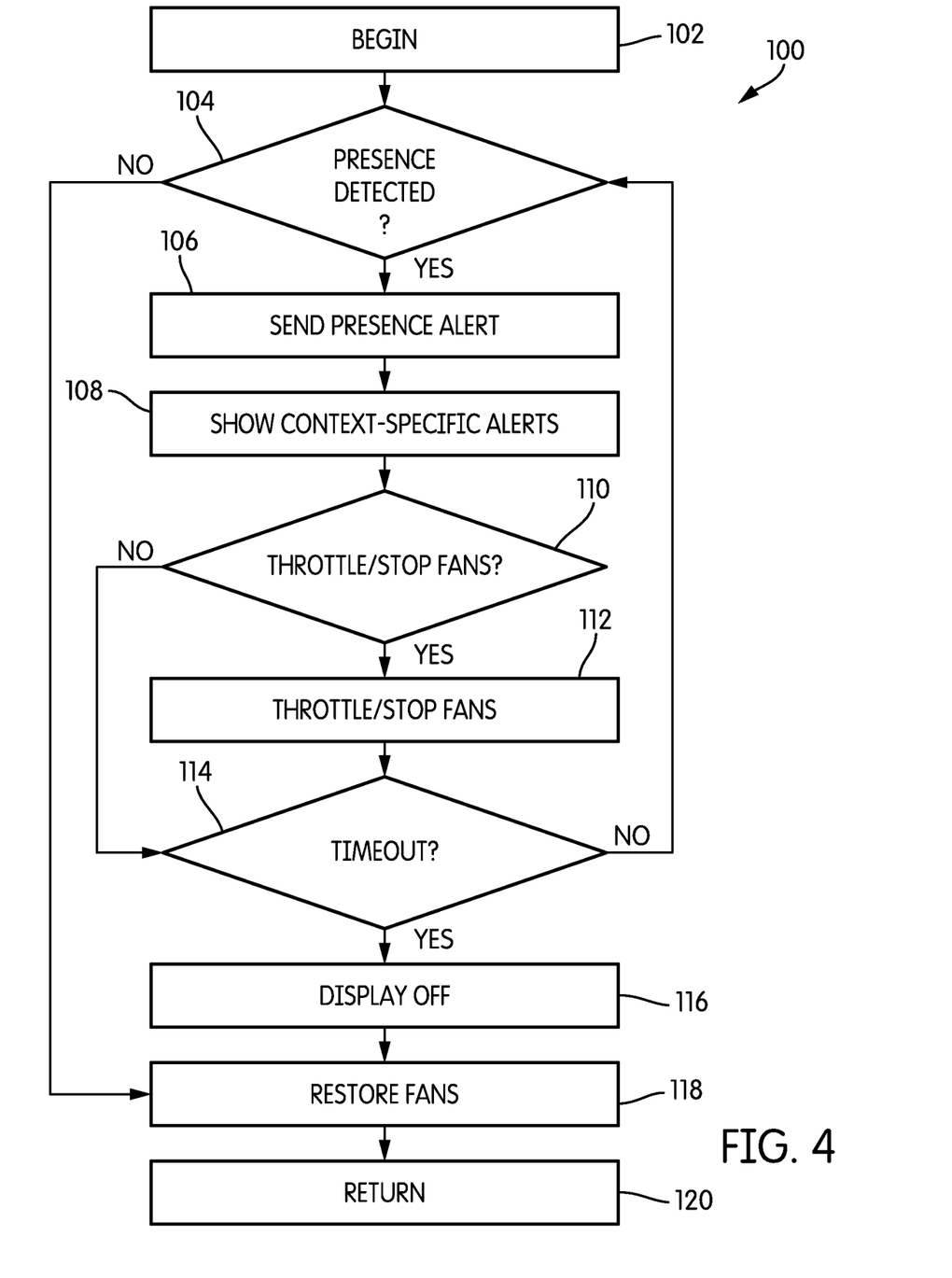
FIG. 4 is a flow diagram illustrating the tasks of another method for responding to a presence detection around the UPS of FIG. 2.

FIG. 4 is a schematic flow diagram of a method, generally indicated at 100, in which some of these other behaviors are triggered in response to a presence detection. Method 100 begins at task 102 and continues with task 104. Task 104 is a decision task in which the controller 34, or other machine executing method 60, determines whether a presence has been detected.

Although presence detection was described simply with respect to method 50 above, in method 50, method 100, and other methods according to embodiments of the invention, presence detection may involve various sub-tasks, as well as tasks that are performed before the methods are executed. For example, the presence sensor 16 would typically be calibrated at the time that the UPS 14 is manufactured and may be re-calibrated when the UPS 14 is installed in the rack 12. From time to time, if the presence sensor 16 detects that ambient conditions have changed, e.g., with an increase in ambient infrared energy in the area, the controller 34 may either automatically re-calibrate the presence sensor 16 to the new ambient conditions or raise an alert so that an engineer or technician can do so.

One situation in which calibration may be particularly useful is if the UPS 14 is installed in a cabinet, rather than a rack. A PIR presence sensor 16, for example, may be able to read ambient conditions from behind the door of the cabinet, but doing so may require that it be calibrated with the cabinet door closed. Some forms of active-emitting presence sensors 16 may also be able to read through a cabinet door if calibrated to do so.

If a presence is detected (task 104:YES), method 100 continues with task 106 and the UPS 14 alerts nearby equipment. This may occur in a variety of ways, depending on the manner in which the UPS 14 and the nearby equipment is connected. In some cases, the UPS 14 may be controlling or communicating directly with certain equipment, or may have a defined relationship and a specific communication bus or communication protocols with that equipment. If so, the presence alert may be communicated using whichever communication bus or protocols are already in between the UPS 14 and the other pieces of equipment.

If a presence is not detected (task 104:NO), method 100 continues with task 118 and fans are restored to at least their normal operating condition before method 100 returns at task 120.

As was described briefly above, most equipment installed in a data center, or in the same location, is connected by an internal network. That network typically uses standard protocols to communicate between equipment, and it may be used to communicate presence alerts to nearby equipment. The manner in which that is done depends on the topology of the network. In particular, the equipment in any particular rack 12 may or may not be aware of its physical location in the data center or on the rack 12. Thus, the presence alert may need to be sent to a central controller or server for the data center network, which then processes the signal to determine which equipment should be notified.

In this embodiment, in response to a presence detection, the display 36 is brought online. In particular, after sending presence alerts in task 106, method 100 continues with task 108, in which the controller 34 powers up the display 36. Once powered up, the display 36 may be used in a context-sensitive manner to show any particular alerts or messages that may be relevant at the moment the presence is detected. For example, the display 36 may show the current status of the UPS 14 and any current alert or error messages.

The display 36 may also show identification or maintenance information in task 108. Identification and maintenance information may include the model name and number of the UPS 14, the serial number of the UPS 14, and the version number of the firmware and/or software currently running on the UPS 14.

As was noted above, most infrastructural equipment in a data center is not connected to an outside network. Thus, it may be difficult to communicate maintenance and error data from such a piece of equipment when a need arises. For that reason, task 108 of method 100 may involve presenting identification and maintenance data along with alert and message data in a format that is easily read by another electronic device, presumably an electronic device that is connected to an outside network.

Figure 5:
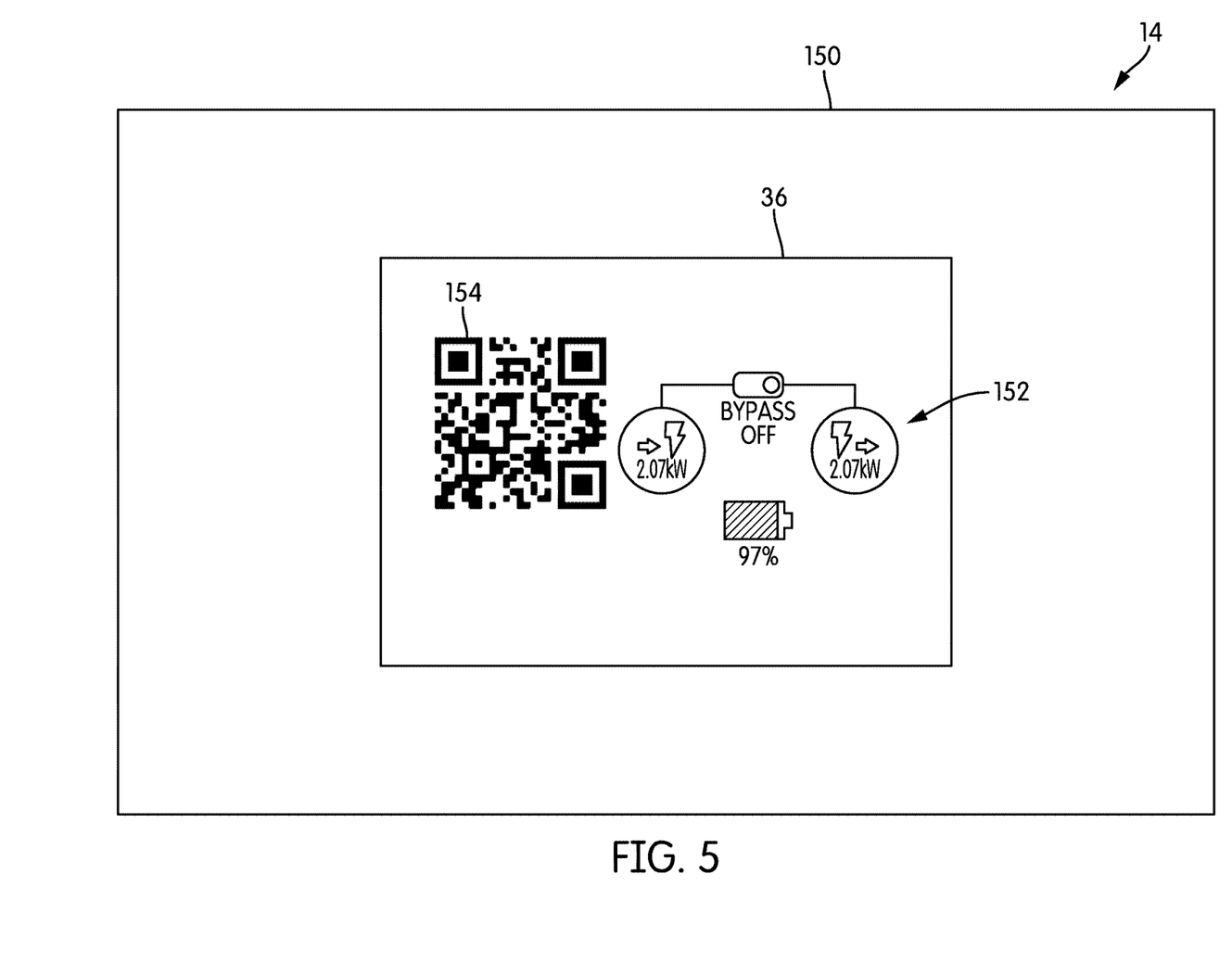
FIG. 5 is an illustration of the front panel and display of a UPS, showing a machine-readable indication of the UPS's identity and status.

FIG. 5 is an illustration of the front panel 150 of the UPS 14. In the illustrated embodiment, the display 36 is centered on the front panel 150. The display shows current status information, generally indicated at 152 which, in this scenario, includes an indication of input power, output power, and whether or not the UPS 14 is operating in a "bypass mode." (In "bypass mode," the UPS 14 uses a power pathway that bypasses its power bus, delivering power directly from the input to the output. The use of bypass mode typically indicates that something is amiss.) In addition to those human-readable indications, the display 36 shows a machine-readable indication 154. In FIG. 5, the machine-readable indication is a QR code 154.

The QR code 154 contains identification and maintenance information, as well as information on any alerts that the UPS 14 has raised. In a typical arrangement, the two-dimensional visual coding of the QR code 154 translates into an Internet URL that directs a browser to a maintenance website and includes the identification, maintenance, and alert information. A typical user might point a cellphone camera at the QR code 154 and be directed to a website that includes step-by-step instructions for resolving an alert that are tailored for the particular UPS 14 unit. The back-end server providing the maintenance information may also log the incoming data, storing it for future reference, equipment reliability studies, etc.

The advantage of a QR code 154 is that most devices with a camera are programmed to deal with QR codes automatically. No special equipment is required. However, there may be circumstances in which it is helpful to have a machine-readable indicator specific to this purpose. That indicator may use custom data formats and a mechanism other than a URL for reporting data and bringing up maintenance instructions. In that case, a custom device, or a customized application on a general-purpose device like a smartphone, may be used to read the indicator and retrieve the necessary information.

With respect to method 100 of FIG. 4, once context-specific alerts and indicators are shown in task 108, method 100 continues with tasks 110 and 112. Tasks 110 and 112 encapsulate the core of method 50, described above. Specifically, task 110 is a decision task in which it is decided whether there are any fans 38, 40 that should be slowed (i.e., throttled down) or stopped.

There are several reasons why it may not be necessary to slow or stop fans. First and foremost, the actions taken by the controller 34 may, in most cases, be set and altered in software. During setup, the controller 34 may be instructed not to alter fan speeds or shut fans off in response to a presence detection. Additionally, in at least some cases, it may not be necessary to slow or stop fans in a piece of equipment. In many cases, the temperature of a piece of equipment can be kept down using passive thermal control measures, like heat sinks, thermal pastes to improve thermal conductivity from heat source to heat sink, etc. With good passive thermal control in place, there may be no fans operating, or there may be only a single small fan to keep air moving, and that fan may not generate significant noise. In other cases, certain components may be liquid-cooled. Although methods like methods 50 and 100 may control the state and speeds of liquid pumping systems in the same ways that these methods control fans 38, 40, pumping systems may not generate sufficient noise to create a problem. Even in a UPS 14 or other piece of equipment that uses significant numbers of fans, computational or power loads may be low enough that the internal components are not generating significant heat and do not require an active fan, so there may be nothing to slow or stop. Finally, air conditioning or low ambient temperature around the UPS 14 or other equipment may be sufficient to keep the internal components at appropriate temperatures without the use of fans 38, 40, so again, there may be nothing to slow or stop.

If it is necessary or desirable to slow or stop fans, pumps, or other such equipment (task 110:YES) method 100 proceeds with task 112 and does so much as described above with respect to method 50. As above, which fans 38, 39, 40, 41 are slowed or stopped will depend on the particular characteristics of the UPS 14 and a number of other factors. If there is no need to slow or stop fans, pumps, or other such equipment (task 110:NO), execution of method 100 continues with task 114.

Task 114 of method 100 implements a timeout. By this point in method 100, the state of the UPS 14 has been altered in some way: the display is on, the fans may have been slowed or stopped, etc. For the same reasons described above, this altered state should not continue indefinitely. (Even if the only alteration is to turn the display 36 on to display information, that consumes power, and extended use of a display may cause burn-in or shorten its lifetime.) Thus, as in method 50, method 100 implements a timeout counter and checks in each iteration to see whether or not the timeout counter has expired. The timeout counter starts when a presence is detected and continues to run from one iteration of method 100 to the next. When the timeout counter expires (task 114:YES), method 100 continues with tasks 116 and 118, the display is turned off, and the fans are restored to an appropriate state for the current status of the UPS 14 before method 100 returns at task 120.

In the description above, a presence detection is treated as a binary decision: a person either is or is not detected. The reality may be more complex. Depending on the type of presence sensor, it may be possible to detect the type of presence, or even the identity of the particular person who is present. Even with a simple PIR presence sensor 16, more nuanced detections may be possible. For example, it may be possible to detect fire.

Figure 6:
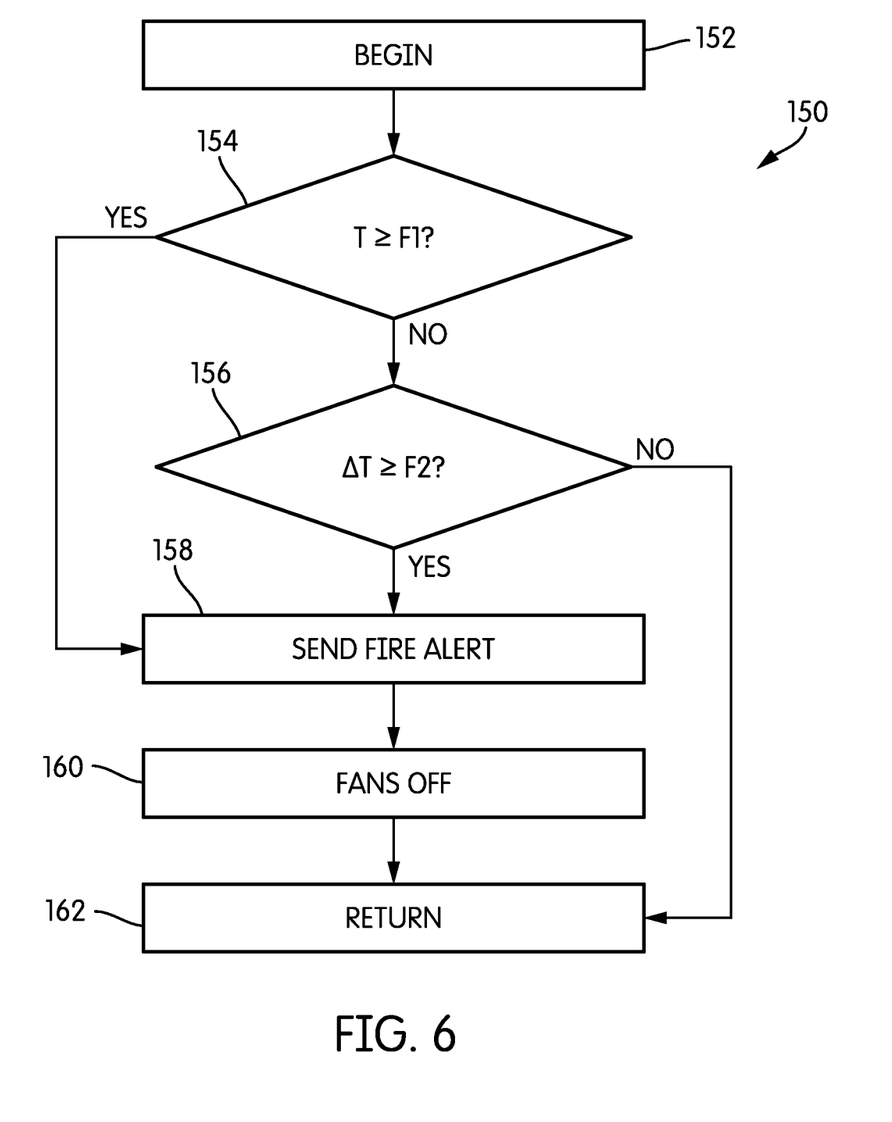
FIG. 6 is a flow diagram illustrating the tasks of a method for fire detection, according to another embodiment of the invention.

FIG. 6 is a flow diagram illustrating a basic method, generally indicated at 150, for detecting and responding to fire. Method 150 assumes that the presence sensor 16 is a PIR presence sensor 16. With such a sensor, there are two ways that a fire might be detected: either the measured level of infrared indicates a temperature significantly greater than the level of infrared and temperature that indicate a person's presence, or the rate of change of the level of infrared or temperature is greater than could be caused by a person's presence.

Thus, method 150 begins at 152 and continues with task 154, a decision task. In this task, the controller 34 reads the presence sensor 16 to determine whether the level of detected infrared energy indicates a temperature (T) that is greater than or equal to a fire detection threshold ($F_1$). The fire detection threshold $F_1$ would typically represent a temperature much greater than human body temperature. If the temperature T is greater than the fire detection threshold Fi (task 154:YES), control of method 150 passes to task 158. If not (task 154:NO), control of method 150 passes to task 156.

Task 156 is a decision task that evaluates the second condition potentially indicative of a fire: a quick rise in temperature. In task 156, the controller takes or evaluates data points taken over a period of time. If the change in temperature per unit of time T is greater than a threshold level of change per unit time ($F_2$), the controller 34 determines that conditions are indicative of a fire (task 156:YES), and control of method 150 passes to task 158. If not (task 156:NO), method 150 returns at task 162.

In task 158, it has been determined that there is likely a fire in proximity to the UPS 14. Thus, the UPS 14 first sends a fire alert through the network to which it is connected. What happens after that may differ somewhat from UPS 14 to UPS 14 and from situation to situation. In method 150, the UPS 14 turns off all operating fans 38, 39, 40, 41 to avoid drawing in smoke and increasing the internal temperature of the UPS 14, as shown in task 160. Method 150 then returns at task 162.

As illustrated, method 150 does not include tasks for re-checking the temperature and/or change in temperature and re-starting the fans 38, 39, 40, 41 when the danger has passed. While such steps could be included, method 150 essentially assumes that recovery from a fire detection will involve some manual steps, or at least, some steps that are commanded through a networked controller. In other words, when the engineers or technicians responsible for the facility have determined that the fire is extinguished and the threat has passed, the UPS 14 may be commanded to return to its normal operating state (or some other state appropriate for the circumstances) remotely via a network interface and typical communication protocols. Alternatively, a passing engineer or technician could command a return to normal operating state via the display 36.

The actions illustrated in the various methods 50, 100, 150 may be performed in different combinations and in different orders than what is shown and described here. As was described above, an operational method for detecting and responding to a presence will depend on the nature of the equipment 14, the particulars of the data center in which the equipment 14 is installed, the ambient and operating conditions, and a number of other factors.

While the invention has been described with respect to certain embodiments, the description is intended to be exemplary, rather than limiting. Modifications and changes may be made within the scope of the invention, which is defined by the appended claims.

What is claimed is:

1. A piece of electronic equipment, comprising:
    a case having mounting structure adapted to allow the piece of electronic equipment to be mounted in a rack or cabinet, and, within the case,
        a presence sensor positioned within the case so as to have a field of view external to the case;
        one or more fans;
        at least one internal component arranged to be cooled by the one or more fans;
        a temperature detection mechanism constructed and arranged to measure a temperature of the at least one internal component and
        a controller connected to the presence sensor, the temperature detection mechanism, and the one or more fans, the controller adapted to change a state of the one or more fans in response to a detection by the presence sensor and to restore the state of the one or more fans prior to the change under one or both of two conditions: (1) when the temperature of the at least one internal component is equal to or greater than the threshold; or (2) a predefined period of time after the change in the state.

2. The piece of electronic equipment of claim 1, wherein the piece of electronic equipment comprises an uninterruptible power supply (UPS).

3. The UPS of claim 2, further comprising a display connected to the controller.

4. The UPS of claim 3, wherein the controller is adapted to turn on the display in response to the detection by the presence sensor.

5. The UPS of claim 4, wherein the controller is adapted to cause the display to display a visual, machine-readable indication of status and maintenance information for the UPS.

6. The UPS of claim 3, wherein the presence sensor comprises a passive infrared sensor.

7. A method, comprising:
    detecting a presence around a piece of rack-mount equipment using a presence sensor installed within the piece of rack-mount equipment so as to have a field of view external to the piece of rack-mount equipment;
    determining an internal temperature of the piece of rack-mount equipment and
    in response to said detecting, temporarily altering a state of the piece of rack-mount equipment to reduce noise while the internal temperature is less than a threshold temperature; and
    restoring the state of the piece of rack mount equipment to a state prior to said detecting under one or both of two conditions: (1) when the internal temperature is equal to or greater than the threshold; or (2) after a predefined period of time from said detecting.

8. The method of claim 7, wherein said altering comprises altering a speed or state of one or more cooling fans.

9. The method of claim 7, wherein said determining comprises measuring an internal temperature of at least one component of the piece of rack-mount equipment; and
    said altering comprises slowing or stopping one or more internal cooling fans that cool the at least one component if the internal temperature of the at least one component is less than a predefined threshold.

10. The method of claim 9, wherein said restoring the state of the piece of rack mount equipment comprises restoring a speed or state of the one or more internal cooling fans.

11. The method of claim 7, wherein said determining the internal temperature further comprises determining one or more internal temperatures of the piece of rack-mount equipment when the presence is detected; and
    controlling a state or a speed of two or more fans individually based on the one or more internal temperatures.

12. The method of claim 7, further comprising determining whether the presence comprises a fire; and
    if the presence comprises a fire, sending an alert.

13. The method of claim 7, wherein the presence sensor comprises a passive infrared sensor.

14. The method of claim 7, further comprising, in response to said detecting, activating a display.

15. The method of claim 14, further comprising displaying on the display an indication of status.

16. The method of claim 15, wherein the indication of status is a machine-readable indication of status.

\* \* \* \* \*